April 16, 1940.　　　J. G. LINDEMAN　　　2,197,273
WHEEL MOUNTING FOR LAND VEHICLES
Filed Nov. 15, 1937　　　2 Sheets-Sheet 1
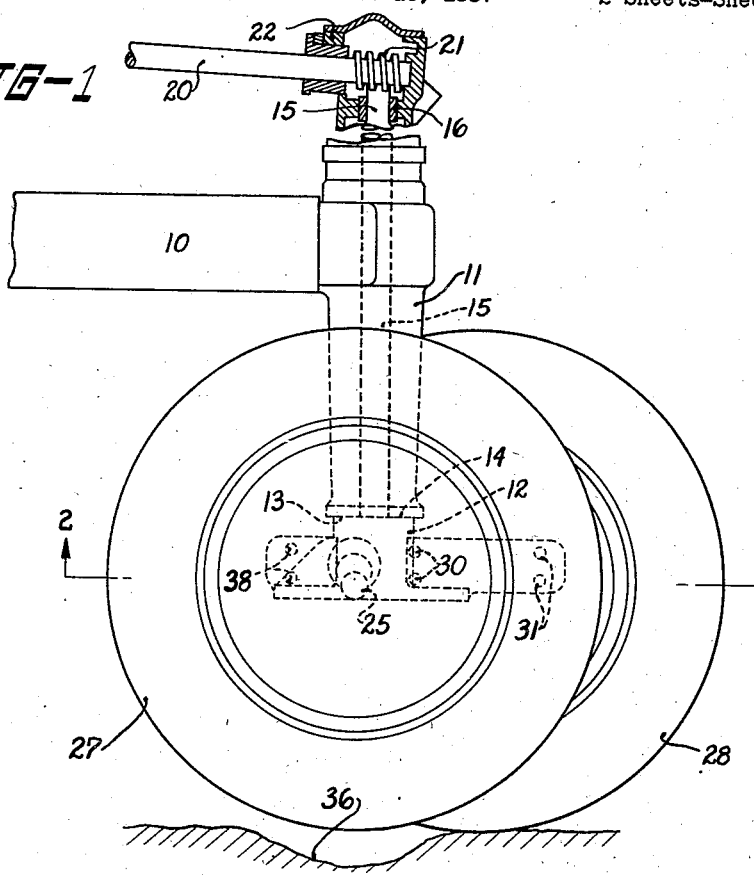
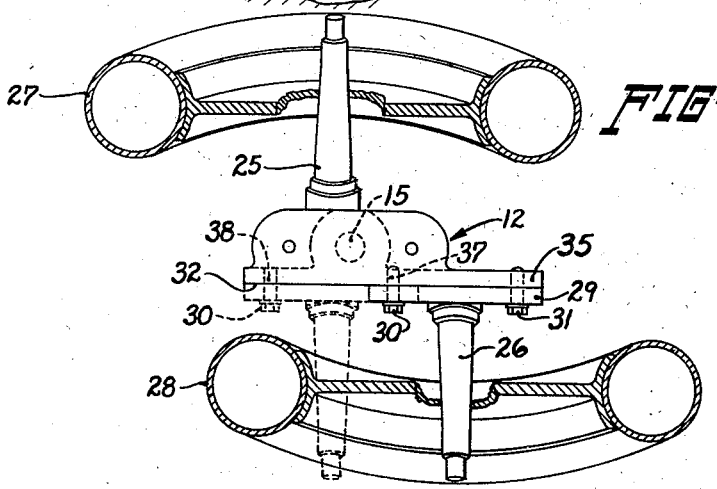
INVENTOR.
Jesse G. Lindeman
BY
ATTORNEYS.

April 16, 1940.  J. G. LINDEMAN  2,197,273
WHEEL MOUNTING FOR LAND VEHICLES
Filed Nov. 15, 1937  2 Sheets-Sheet 2
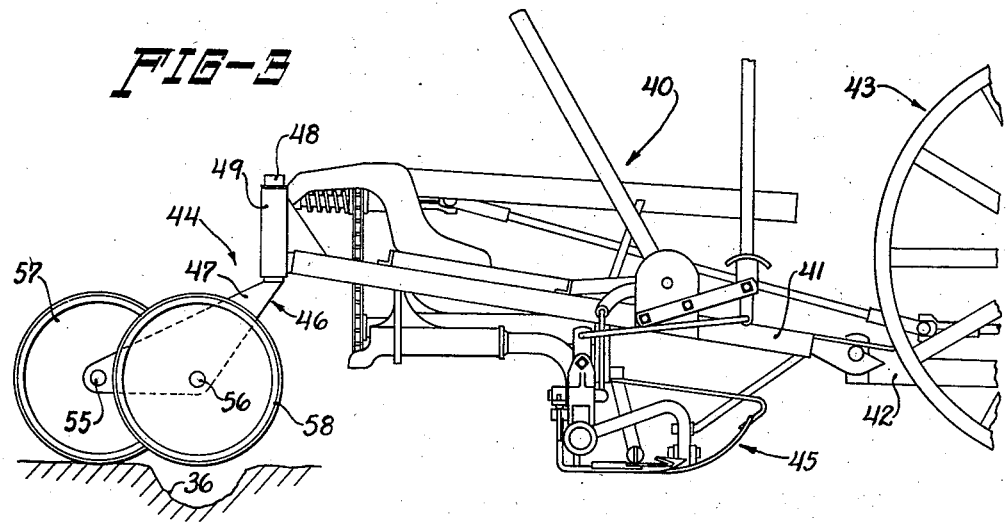
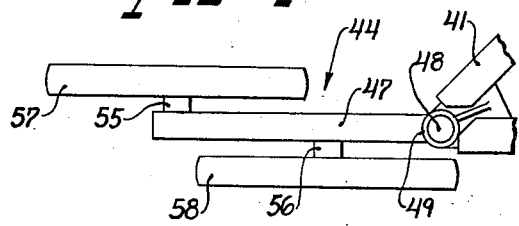
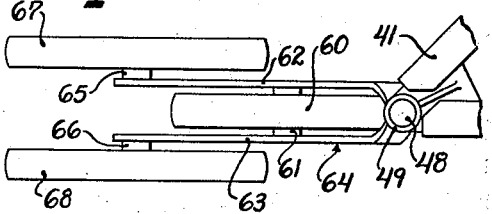
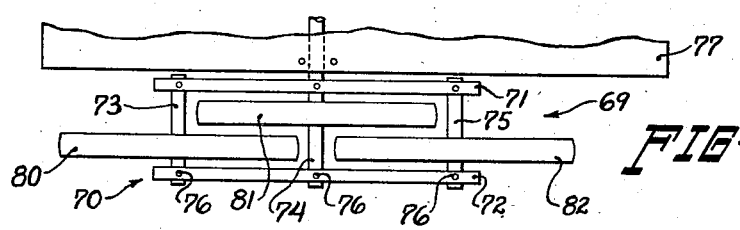
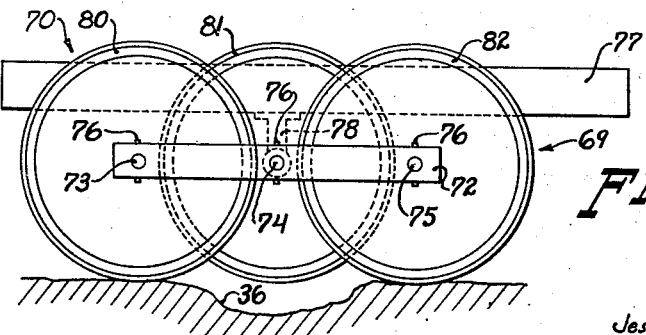
INVENTOR.
Jesse G. Lindeman
ATTORNEYS.

Patented Apr. 16, 1940

2,197,273

UNITED STATES PATENT OFFICE 2,197,273

WHEEL MOUNTING FOR LAND VEHICLES

Jesse G. Lindeman, Yakima, Wash., assignor to Deere & Company, Moline, Ill., a corporation of Illinois Application November 15, 1937, Serial No. 174,600

8 Claims. (Cl. 280—87)

The present invention relates generally to wheel mountings for land vehicles and more particularly to wheel mountings for use with agricultural implements. The principal object of this invention is to provide a pivoting or swinging truck for a vehicle, which is adapted to travel with a minimum of bumping and jarring on land which contains ridges or depressions as, for example, furrows or irrigation ditches. In the accomplishment of this general object, the truck, which is pivotally connected to the vehicle or implement, is provided with overlapping wheels, which are each disposed normally in engagement with the ground and support the truck at a plurality of points spaced longitudinally of the line of advance of the vehicle and comparatively close together, whereby when one of the wheels passes over a ditch, the truck will be supported on one of the other related wheels.

A further object of this invention is concerned with the provision of a dirigible wheeled truck for a tractor or other vehicle supported on overlapping longitudinally spaced wheels.

Another object has to do with the provision of a convertible truck in which provision is made for optionally attaching the wheels either in transverse alignment or offset longitudinally of one another for operation selectively on smooth land or on land having ridges or ditches.

Another object relates to the provision of a castering truck adapted to ride smoothly over ditches and other depressions.

A further object has to do with the provision of a wheeled truck which is pivotally mounted for vertical swinging relative to the vehicle to accommodate itself to uneven ground and which has a plurality of longitudinally spaced supporting points to enable the truck to pass over uneven ground surfaces.

These and other objects will be made apparent by a consideration of the following description of several preferred embodiments of my invention, reference being had to the appended drawings, in which:

Figure 1 is an elevational view of the steering truck of a tractor of the tricycle type, in which are embodied the principles of my invention;

Figure 2 is a sectional view taken along a line 2—2 in Figure 1;

Figure 3 is a side elevation showing a mower having a rear caster wheel support, in which are embodied the principles of this inventon;

Figure 4 is a plan view of the castering supporting truck shown in Figure 3;

Figure 5 is a plan view of a castering truck embodying a modification of the caster wheel support shown in Figures 3 and 4;

Figure 6 is still another embodiment of my invention showing a wheel mounting comprising a truck which is swingable about a horizontal axis; and Figure 7 is a side elevation of the truck shown in Figure 6.

Referring now to the drawings and more particularly to Figures 1 and 2, reference numeral 10 indicates the forward portion of the frame of a tractor of the tricycle type, to the end of which is rigidly secured a vertically disposed tubular post 11, the lower end of which rests upon a supporting knuckle 12. The lower surface 13 of the post 11 bears upon the upper surface 14 of the steering knuckle, which is rotatable with respect thereto about a central vertical axis. A steering spindle 15 is fixed to the knuckle 12 and extends vertically upward through the hollow interior of the post 11 and is rotatably held at its upper end in a bearing sleeve 16, for rotation about the axis of rotation of the steering knuckle. The spindle 15 is rotated by conventional steering mechanism comprising a horizontally disposed control shaft 20 connected to the spindle by a worm 21 fixed to the shaft 20 and meshing with a suitable worm gear (not shown) attached to the upper end of the spindle 15. The worm gear connection is enclosed by a suitable housing 22.

The knuckle 12 is supported on a pair of stub axles 25, 26 which extend laterally outwardly from opposite sides of the knuckle and on which are suitably journaled a pair of ground wheels 27 and 28, respectively. The axles are inclined slightly downwardly in order to set the wheels in downwardly converging planes as is conventional in tractors of the tricycle type. One of the axles 25 is preferably rigidly fixed on the steering knuckle 12 while the other axle is fixed on a plate 29, which is detachably secured by stud bolts 30, 31 to a longitudinal vertical face 32 formed on the opposite side of the knuckle 12. As indicated in Figure 2, the last mentioned axle 26 can be optionally attached to the face 32 in either of two positions spaced longitudinally with respect to the line of advance of the tractor. The position of the axle 26 indicated by dotted lines, indicates the conventional position directly opposite the fixed axle 25, wherein the wheel 28 is mounted in transverse alignment with the wheel 27. This position is adapted for ordinary operation of the tractor over comparatively smooth ground surfaces. The other position of the wheel 28 is shown in solid lines in the drawings and in this position the side plate 29 is bolted to a forwardly extending flange projection 35 on the side of the knuckle 12. In this position the wheel 28 is offset forwardly from the wheel 27 with the result that when the truck passes over a small ditch or depression as indicated by reference numeral 36, Figure 1, each of the wheels when passing over the ditch is supported by the other wheel which is in contact with the ground at the side of the ditch. In this way, although the overlapping wheels are close enough together to run as a unit and give the effect of a single ground contact for ease of steering, by their overlapped position, the ground contact is expanded whereby they do not drop simultaneously into the ditch as they do when the wheels are disposed directly opposite to one another, and so tend to carry the truck across the depressions smoothly and substantially without jarring.

A conversion of the overlapping wheel truck into one of conventional form is quickly and easily accomplished by removing the bolts 30, 31 and moving the side plate 29 rearwardly to a position in which the bolts 31 can be inserted through the openings 37 formerly occupied by the bolts 30 while the bolts 30 are inserted in the rearward set of holes 38.

Referring now more particularly to Figures 3 and 4, reference numeral 40 indicates a mower of a more or less conventional form as, for example, the mower shown and described in Patent No. 2,004,213 issued June 11, 1935, to Paul. The mower 40 comprises a generally horizontal frame 41 supported at its forward end on the drawbar 42 of a tractor 43 and at its rear end on a castering truck 44. The mowing mechanism is indicated generally by the reference numeral 45 and is supported on the frame 41. The truck 44 includes a supporting member 46, which, in the simple form shown, comprises a generally triangular plate member 47 to the forward end of which is rigidly secured a spindle 48, which extends vertically through a sleeve 49 rigidly attached to the rear portion of the frame 41 of the mower. The spindle 48 is journaled within the sleeve 49, thereby permitting the plate 47 to swing laterally about the axis of the spindle 48. A pair of stub axles 55, 56 are fixed rigidly to the plate 47 and extend laterally outwardly from opposite sides thereof. A pair of ground wheels 57, 58 are journaled on the axles 55, 56, respectively, and are disposed in overlapping relation to one another by virtue of the fact that the axles 55, 56 are spaced from each other longitudinally relative to the supporting member 46, a distance which is less than the diameter of the wheels.

In operation the caster truck 44 will follow the mower in proper trailing position due to the fact that the axis of the spindle 48 is offset on the plate member 47 from the midpoint between the axles 55, 56. Although in the drawings the axis of the spindle 48 is disposed ahead of both axles 55, 56, a lesser degree of castering action would be obtained if the axis of the spindle passed between the two wheel axles but closer to one of the axles than to the other.

The principle of operation of the caster wheel mounting described above is similar to that of the dirigible truck in that, by virtue of the longitudinal spacing of the overlapping wheels 57, 58, either one or the other is in contact with the ground when its companion is passing over a depression in the ground, thus resulting in less jarring of the implement.

In Figure 5 the castering truck 44 is provided with three axles instead of two as in Figure 4, one of the wheels 60 being journaled on an axle 61 supported between a pair of legs 62, 63 of a bifurcated supporting member 64, to which the spindle 48 is attached. The legs 62, 63 extend rearwardly and support at their rearward ends a pair of laterally outwardly extending axles 65, 66, which are disposed in transverse alignment and are journaled in wheels 67, 68, respectively. The latter wheels are thus disposed on opposite sides of the first mentioned wheel 60 and overlap the latter by virtue of the longitudinal spacing between the axle 61 and the rear axles 65, 66.

The advantage of this embodiment over the one shown in Figure 4 is that there is no lateral twisting action on the spindle 48 when either the forward wheel 60 or the rear wheels 67, 68 pass over the depression, for the downward pressure of the frame 41 on the supporting member 64 is resisted by upwardly reacting forces, the resultant of which is disposed in the central longitudinal plane of the truck.

Referring now to Figures 6 and 7, the truck 69 includes a framework 70 comprising a pair of longitudinally extending frame bars 71, 72 spaced laterally and interconnected by three longitudinally spaced axles 73, 74, 75, which are fixed rigidly to the frame bars by pins 76. The central axle 74 is extended under the frame 77 of the vehicle and is journaled in a bearing 78, fixed to the frame and depending therefrom. The other two axles 73 and 75 are spaced substantially equally fore and aft, respectively, of the central axle 74 but the latter axles terminate at each of the side bars 71, 72 in which they are supported.

On each of the axles 73, 74, 75, is journaled a ground wheel 80, 81, 82, respectively, and since the spacing between the axles is less than the diameter of a single wheel, the wheels necessarily overlap each other. Preferably, as shown in Figures 6 and 7, the two outer wheels 80 and 82 are disposed in longitudinal alignment while the middle wheel 81 is disposed adjacent and in overlapping relation to the wheels 80, 82. It is thus evident that in this embodiment of the present invention there are three longitudinally spaced points of support rather than two, and thus tend to produce even smoother riding action over rough ground than the other embodiments. By virtue of the journaled support 78 of the frame on the central axle 74, the truck frame 70 is allowed to swing vertically in order to maintain as many of the wheels in contact with the ground as possible, thus resulting in a stable but flexible support.

I do not intend my invention to be limited to the exact details shown and described herein except as limited by the following claims.

I claim:

1. A wheel mounting for land vehicles comprising a frame, a pair of wheels arranged axially and a wheel interposed between said pair of wheels but offset longitudinally therefrom, all of said wheels rotatably mounted on said frame in fixed position with their ground engaging portions constantly disposed in the same plane, and means for attaching said frame to the vehicle for horizontal oscillation.

2. A wheel mounting for a vehicle having a frame, comprising a substantially vertical spindle journaled on said frame, a supporting member connected to said spindle adjacent the lower end thereof, a pair of longitudinally spaced, transversely disposed axles supported on said member and inclined outwardly and downwardly therefrom, and a pair of normally ground engaging wheels mounted on said axles for rotation in downwardly converging planes, the axis of said spindle being spaced longitudinally from each of said axles and from the mid-point between said axles.

3. A castering wheel mounting for a vehicle frame, comprising a wheel-supporting member, a pair of inclined wheels normally engaging the ground and journaled on said member for rotation in downwardly converging planes about axes disposed in spaced relation to each other, and means for supporting said frame on said supporting member providing for swinging movement of said member substantially horizontally relative to said frame on an axis spaced closer to one of said wheel axes than to the other.

4. A castering wheel mounting for a vehicle frame, comprising a wheel-supporting member, a pair of overlapping ground wheels journaled on said member adjacent to one another, the axes of rotation of said wheels being disposed in generally horizontally spaced relation to each other, and a substantially vertical spindle adapted to be journaled on said vehicle frame, said spindle being mounted on said supporting member on an axis spaced closer to one of said wheel axes than the other.

5. A dirigible wheel mounting for a vehicle frame, comprising a wheel-supporting member, a pair of ground wheels journaled on said member in overlapping relation for rotation about axes disposed in fore and aft spaced relation to each other, a substantially vertical spindle fixed to said member and journaled on said frame, and steering means connected with said spindle.

6. In combination, a wheel supporting member, an axle fixed thereto, a ground wheel journaled on said axle, a detachable second axle, means for selectively attaching said second axle to said member either in coplanar or in offset relation with respect to said fixed axle, and a second ground wheel journaled on said second axle.

7. In a vehicle having a frame, a convertible wheel mounting comprising in combination, a wheel supporting member, an axle fixed thereto and extending laterally therefrom, a ground wheel journaled on said axle, a detachable second axle extending laterally from the opposite side of said member, a wheel journaled on said second axle, and means for selectively attaching said second axle to said member either directly opposite said fixed axle for normal operation over smooth ground, or spaced longitudinally horizontally from said fixed axle to position said wheels in overlapping arrangement for operation over rough ground.

8. In a tractor having a frame, a single dirigible supporting truck disposed at the forward end of said frame, said truck comprising a steering knuckle, an axle fixed thereto and extending laterally from one side thereof, a ground wheel journaled on said axle, a second axle attached to said knuckle and extending laterally from the opposite side of said knuckle, said axles being disposed in offset relation with respect to each other, and a second ground wheel journaled on said second axle, said tractor frame being supported on said knuckle providing for rotation of said knuckle relative to said frame, and steering mechanism for controlling said knuckle.

JESSE G. LINDEMAN.